Patented Aug. 3, 1943

2,325,783

UNITED STATES PATENT OFFICE 2,325,783

SEPARATION OF LOWER POLYHYDRIC ALCOHOLS FROM POLYHYDRIC ALCOHOL MIXTURES

Eugene J. Lorand, Wilmington, Del., assignor to Hercules Powder Company, Wilmington, Del., a corporation of Delaware No Drawing. Application September 7, 1940, Serial No. 355,807

6 Claims. (Cl. 260—637)

This invention relates to the separation of the lower polyhydric alcohols from a mixture of polyhydric alcohols, more particularly to the separation of polyhydric alcohols containing from 2 to 4 carbon atoms from such a mixture, and still more particularly to the separation of glycol and glycerol from such a mixture.

So far as I am aware, there is no prior art directly relating to this invention. There is, however, abundant literature on the direct recovery of glycerol from concentrated glycerol-fermented mash or wort, or from distillers' slop or other aqueous glycerol solutions or concentrates. In all of these cases, the problem is the recovery of glycerol alone which is the only polyhydric alcohol which is present in substantial quantities in the mash or slop, etc. The instant problem is essentially different and involves the separation of one or more lower polyhydric alcohols from an admixture of a large number of polyhydric alcohols, such as are obtained from the hydrogenation of formaldehyde condensates.

The object of this invention is to provide a process for the separation of polyhydric alcohols, and more particularly to provide a process for the separation of the lower polyhydric alcohols, such as glycol and glycerol, from the higher ones, such as the pentitols and the hexitols. One possible simple method of separation of lower polyhydric alcohols from a mixture containing higher ones appears to be that of fractional distillation at reduced pressures. But here very low pressures must be used to avoid decomposition of the non-volatile polyhydric alcohols, and the process cannot be said to be feasible. Then again, hydrogenated formaldehyde condensation products usually contain certain acetal-type derivatives of polyhydric alcohols, the exact composition of which is not known, which upon decomposition yield compounds of the furfural type. This decomposition takes place at low pressures and the products of the reaction have boiling points close to those of glycol and glycerol. Hence the isolation of the latter is rather difficult.

It is a further object of this invention to effect the separation of polyhydric alcohols, and in particular, the isolation of the lower polyhydric alcohols without decomposition and the accompanying contamination of the yield by decomposition products.

Other objects and advantages of this invention will appear by reference to the following specification.

The above objects are accomplished by a novel, selective solvent action on the aforementioned hydrogenated formaldehyde condensates or other mixtures containing polyhydric alcohols. The processes embodying my invention are feasible and economical and give unusually satisfactory results to be hereinafter described.

In accordance with this invention, a mixture of polyhydric alcohols is brought into contact with an organic solvent which selectively dissolves the alcohols of lower molecular weight; the liquids are agitated; the resultant layer containing the major portion of the solvent is separated; and the alcohols are recovered by distilling off the solvent at reduced pressure.

The processes embodying my invention are particularly adapted for removing polyhydric alcohols of lower molecular weight from mixtures of polyhydric alcohols obtained in the hydrogenation of formaldehyde condensation products. When such condensation products are subjected to catalytic hydrogenation under high pressure, a mixture of polyhydric alcohols ranging from those containing 2, to those containing 6 carbon atoms or more results. Processes have been devised to so conduct the condensation of formaldehyde (see my co-pending application, S. N. 293,978), that mainly the lower sugars are formed, the hydrogenation of which then yields a polyhydric alcohol mixture with the lower members of the series predominating. However, even here there are some of the higher polyhydric alcohols such as pentitols, and the hexitols.

In accordance with my invention, I have found that certain, mostly oxygen-containing solvents, have a decreasing solvent effect on polyhydric alcohols of increased molecular weight. For example, acetone is miscible with glycol in every proportion, but dissolves only a relatively small percentage of glycerol. Dioxan is miscible with glycol in the cold, but with glycerol only in the hot. Cold butanol is miscible with both glycol and glycerol, but is a poor solvent for erythritol. The latter dissolves readily in hot butanol. The solvent power of all these solvents diminishes as the number of carbon atoms in the polyhydric alcohols increases. When a solvent of this class is used as an extractor in a mixture of polyhydric alcohols, the solution will contain mainly the lower polyhydric alcohols with only small amounts of the higher ones. Upon distilling off the solvent, the resultant lower polyhydric alcohols can be subjected to fractional distillation in order to separate the constituents.

I select a solvent which is miscible with, or at least dissolves substantial amounts of, glycol or both glycol and glycerol, etc., depending upon which component or components it is desired to remove, but which is not a good solvent for erythritol and even less so for the higher members in the series. Such solvents are numerous and belong to various groups, for instance; ketones, such as acetone, methyl ethyl ketone and cyclohexanone; esters of lower aliphatic acids, such as ethyl formate, methyl acetate, ethyl acetate, isopropyl acetate, methyl propionate, methyl acetoacetate, etc.; alcohols, such as butanol, primary n-amyl alcohol, primary isoamyl alcohol, sec-butylcarbinol, methylpropylcarbinol, diethylcarbinol, tert-amyl alcohols, mixtures of these pentanols, etc.; alcohol ethers, such as ethylene glycol monobutyl ether; ether esters, such as ethylene glycol monoethyl ether acetate, ethylene glycol monomethyl ether acetate, etc.; nitrogen-containing solvents, such as nitromethane, etc.; cyclic ethers, such as dioxan, etc.

In carrying out the processes embodying my invention, a mixture of polyhydric alcohols, such as, for example, a hydrogenated formaldehyde condensate, is mixed with an equal volume of, for example, acetone, dioxan, isopropyl acetate or any mixture thereof. I have found that it is advisable to operate with a large excess of solvent, for, inasmuch as the polyhydric alcohols are mutually soluble, their solubility in a solvent is influenced by the presence of others. For the same reason, it is advantageous to start the extraction at a lower temperature and raise it gradually, as increasing amounts of the lower polyhydric alcohols have been eliminated. The mixing is carried out by agitation in any suitable vessel either with or without the application of heat, as desired. After thorough agitation, the mixture is allowed to stand until a separation of the material into two phases takes place. The extract phase containing the lower polyhydric alcohols may be removed in any desirable manner; for example, by decantation or the like. The polyhydric alcohols may then be recovered by distillation. This entire process may then be repeated until there is no further practical recovery.

The following examples are illustrative of the methods hereinbefore described, and it is, of course, to be understood that my invention is not to be limited to the specific details of the examples described.

*Example 1*

A mixture was prepared with the following composition:

| | Parts by weight |
|---|---|
| Glycol | 25 |
| Glycerol | 20 |
| Erythritol | 15 |
| Xylitol | 20 |
| Sorbitrol | 20 |

Two hundred parts by weight of the above mixture was subjected to progressive extraction with dioxan. About 103 parts by weight of dioxan was added to the mixture and the whole agitated for about 1 hour. The liquid was then decanted and the residue treated with fresh dioxan. As the polyhydric alcohol mixture was completely soluble in hot dioxan, the first three extractions were carried out at 22° C. In this way, enough glycol was removed from the mixture to make warm extraction possible, i. e. to obtain a good separation into layers after treatment with hot dioxan. Five extractions were thus made at 80° C. The decanted solutions were allowed to cool to precipitate the higher polyhydric alcohols. By evaporating the solvent from the residual liquids, the extracts were determined. The following table shows the progress of the extraction:

| Extract No. | Solution withdrawn | Precipitate on cooling | | Solution left | Extract in cold solution | |
|---|---|---|---|---|---|---|
| | | Total | Per 100 parts of solution | | Total | Per 100 parts of solution |
| 1 | 70.1 | | | | 10.9 | 15.3 |
| 2 | 83.2 | | | | 4.4 | 5.3 |
| 3 | 138.2 | | | | 6.9 | 5.0 |
| 4 | 135.1 | 12.5 | 9.3 | 120.1 | 18.2 | 15.4 |
| 5 | 108.2 | 8.1 | 7.6 | 93.7 | 7.0 | 7.5 |
| 6 | 137.8 | 8.9 | 6.5 | 126.9 | 7.1 | 5.6 |
| 7 | 123.1 | 7.5 | 5.8 | 113.8 | 5.7 | 5.1 |
| 8 | 107.3 | 3.0 | 2.8 | 100.2 | 4.7 | 4.7 |
| | 903.0 | | | | 64.9 | |

Amounts are in parts by weight.

*Example 2*

A similar extraction of the same polyhydric alcohol mixture was carried out with acetone, except that a 200 parts by weight portion of the mixture was treated first with 198 parts by weight, then, subsequently, 7 times with 158 parts by weight of acetone at reflux temperature. The course of the extraction may be followed in the next table.

| Extract No. | Solution withdrawn | Precipitate on cooling | | Solution remaining | Extract in cold solution | |
|---|---|---|---|---|---|---|
| | | Total | Per 100 parts of solution | | Total | Per 100 parts of solution |
| 1 | 188.9 | 6.6 | 3.5 | 178.5 | 20.3 | 11.4 |
| 2 | 216.3 | 5.4 | 2.5 | 205.5 | 18.9 | 9.2 |
| 3 | 172.5 | 3.5 | 2.0 | 166.2 | 10.6 | 6.4 |
| 4 | 161.8 | 2.8 | 1.7 | 155.1 | 12.2 | 7.9 |
| 5 | 137.9 | 0.4 | 0.3 | 135.7 | 6.4 | 4.5 |
| 6 | 207.4 | 2.6 | 1.3 | 195.9 | 6.5 | 3.3 |
| 7 | 167.2 | 0.7 | 0.4 | 164.0 | 6.2 | 3. |
| 8 | 120.3 | 0.4 | 0.3 | 118.0 | 2.5 | 2.1 |

Amounts are in part by weight.

All the extracts obtained were combined and subjected to fractional distillation at low pressure, whereby 78% of the original glycol input and 70% of the glycerol were recovered.

If desired, the processes herein described may be carried out continuously. Satisfactory apparatus for such operation includes a deep vessel about six times as high as the diameter of its cross section, jacketed to maintain a constant temperature within. An extractor head fits into the top of the vessel. A bearing which holds a mechanical stirrer is fastened to the uppermost part of the head and extends down to the bottom of the vessel. The stirrer is equipped with a propeller blade which serves to mix intimately the mixture of polyhydric alcohols contained in the vessel and the extracting solvent which is continuously run between the bearing and the stirrer into the bottom of the vessel. This solvent selectively dissolves the alcohols of lower molecular weight, and the resulting solution which is of lower specific gravity than the mixture containing substantially more of the higher polyhydric alcohols slowly rises to the top of the vessel and into the extractor head whence it flows off and is collected.

*Example 3*

Using the above described process, 200 parts by weight of the same polyhydric alcohol mixture as used in the preceding examples was extracted with acetone. The temperature of 56° C. was maintained by refluxing acetone in the jacket. The rate of flow of the extracting acetone was about 40–80 parts by weight per hour. About 100–200 parts by weight portions of the out-flowing solution were worked up by first cooling to room temperature to precipitate the higher polyhydric alcohols, and then distilling off the solvent from the remaining solution. The following table shows the details:

| Fraction No. | Solution withdrawn | Precipitate on cooling | | Solution remaining | Extract in cold solution | |
|---|---|---|---|---|---|---|
| | | Total | Per 100 parts of solution | | Total | Per 100 parts of solution |
| 1 | 89.6 | 1.6 | 1.8 | 87.2 | 7.0 | 12.4 |
| 2 | 125.4 | 2.2 | 1.8 | 122.3 | 9.2 | 7.5 |
| 3 | 248.1 | 3.0 | 1.2 | 237.9 | 14.7 | 6.2 |
| 4 | 175.6 | 1.7 | 1.0 | 167.7 | 10.2 | 6.1 |
| 5 | 184.6 | 1.9 | 1.0 | 184.4 | 9.5 | 5.3 |
| 6 | 184.4 | 1.7 | 0.9 | 181.1 | 6.4 | 3.5 |
| 7 | 174.3 | 1.7 | 1.0 | 171.3 | 5.8 | 1.7 |
| 8 | 176.8 | 1.2 | 0.7 | 174.2 | 2.9 | 1.6 |
| 9 | 170.5 | 1.4 | 0.8 | 167.6 | 2.7 | 1.e |
| 10 | 175.4 | 1.5 | 0.9 | 173.3 | 2.8 | 0.3 |
| 11 | 100.2 | 0.9 | 0.8 | 99.0 | 0.3 | 1.9 |
| From remaining liquor in the apparatus | | | | 690.3 | 13.3 | |
| | | Total=18.8 parts by weight | | | Total=84.8 parts by weight | |

An even better method is one involving the application of the counter-current principle. In a packed tower, the polyhydric alcohol mixture follows the path determined by gravity, while the solvent is forced in the opposite direction, so that fresh solvent, at the bottom of the tower, comes into contact with a nearly exhausted mixture, while the nearly saturated solution leaches fresh polyhydric alcohol mixture at the top of the tower. The tower is suitably jacketed so as to insure any temperature desired. With the proper choice of solvent, temperature, rate of flow, etc., complete separation of the lower polyhydric alcohols may be obtained.

It should be understood that in carrying out the processes embodying my invention, instead of a single extracting solvent, a combination of several solvents may be used either in mixture or consecutively. For example, after extracting a polyhydric alcohol mixture with acetone to the extent that more than ½ of the combined glycol and glycerol content has been removed, the extract may be continued with cold or hot butanol. In the first case, only glycol and glycerol are removed; in the latter case, erythritol is also extracted.

There are many advantages inherent in the processes hereinbefore described. In the first place, they provide a method for the extraction of polyhydric alcohols of lower molecular weight from those of higher molecular weight which is practical and economical as shown by the results obtained. Still better yields could be obtained by increasing the time of contact between the mixture and the solvent until equilibrium is reached, or by the use of the counter-current principle described above. Then in addition to the feasibility of the method, I get a product which is uncontaminated by any thermal decomposition products.

It will be understood that the details and examples hereinbefore set forth are for purposes of illustration only and that the invention as herein broadly described and claimed is in no way limited thereby.

What I claim and desire to protect by Letters Patent is:

1. A process for separating polyhydric alcohols containing from 2 to 4 carbon atoms from a mixture containing such polyhydric alcohols in admixture with polyhydric alcohols of more than 4 carbon atoms which comprises the steps of bringing the mixture into contact with acetone, agitating the liquids, allowing a separation into two phases, removing the resultant phase containing the major proportion of the acetone and recovering the 2 to 4 carbon atom polyhydric alcohols in any desirable manner.

2. A process for separating polyhydric alcohols containing from 2 to 4 carbon atoms from a mixture containing such polyhydric alcohols in admixture with polyhydric alcohols of more than 4 carbon atoms which comprises the steps of bringing the mixture into contact with acetone, heating to reflux temperature, while agitating the liquids, allowing a separation into two phases, removing the resultant phase containing the major proportion of the acetone, cooling said phase to precipitate the higher polyhydric alcohols, separating the precipitate and recovering the 2 to 4 carbon atom polyhydric alcohols in any desirable manner.

3. A process for separating glycol and glycerol from a mixture containing such polyhydric alcohols in admixture with higher polyhydric alcohols which comprises the steps of bringing the mixture into contact with acetone, heating to reflux temperature, while agitating the liquids, allowing a separation into two phases, removing the resultant phase containing the major proportion of the acetone, cooling said phase to precipitate the higher polyhydric alcohols, separating the precipitate and recovering the glycol and glycerol in any desirable manner.

4. A process for separating polyhydric alcohols containing from 2 to 4 carbon atoms from a mixture containing such polyhydric alcohols in admixture with polyhydric alcohols of more than 4 carbon atoms which comprises the steps of bringing the mixture into contact with a ketone which is a solvent for the 2 to 4 carbon atom polyhydric alcohols but which has no substantial solvency power on the polyhydric alcohols of more than 4 carbon atoms, agitating the liquids, allowing a separation into two phases, removing the resultant phase containing the major proportion of the solvent and recovering the 2 to 4 carbon atom polyhydric alcohols."

5. A process for separating polyhydric alcohols containing from 2 to 4 carbon atoms from a mixture containing such polyhydric alcohols in admixture with polyhydric alcohols of more than 4 carbon atoms which comprises bringing the mixture into contact with a ketone which is a solvent for the 2 to 4 carbon atoms polyhydric alcohols but which has no substantial solvency power on the polyhydric alcohols of more than 4 carbon atoms, countercurrently flowing the said mixture and the ketone while in contact with each other, separating the ketone phase from the polyhydric alcohol mixture phase and recovering 2 to 4 carbon atom polyhydric alcohols from the ketone phase.

6. A process for separating polyhydric alcohols containing from 2 to 4 carbon atoms from a mixture containing such polyhydric alcohols in admixture with polyhydric alcohols of more than 4 carbon atoms which comprises bringing the mixture into contact with acetone, countercurrently flowing the acetone and the said polyhydric alcohol mixture while in contact with each other, separating the acetone phase from the polyhydric alcohol mixture phase, and recovering 2 to 4 carbon atom polyhydric alcohols from the acetone phase.

EUGENE J. LORAND.